(12) United States Patent
Kim et al.

(10) Patent No.: US 10,019,511 B2
(45) Date of Patent: Jul. 10, 2018

(54) BIOLOGY-RELATED DATA MINING

(71) Applicant: KT Corporation, Seongnam-si, Gyeonggi-do (KR)

(72) Inventors: Sang-hee Kim, Seoul (KR); Kwang-Joong Kim, Seoul (KR); Mi-sook Lee, Seoul (KR)

(73) Assignee: KT CORPORATION, Seongnam-si, Gyeonggi-Do (KR)

( * ) Notice: Subject to any disclaimer, the term of this patent is extended or adjusted under 35 U.S.C. 154(b) by 612 days.

(21) Appl. No.: 14/584,169

(22) Filed: Dec. 29, 2014

(65) Prior Publication Data
US 2015/0186470 A1     Jul. 2, 2015

(30) Foreign Application Priority Data

Dec. 30, 2013   (KR) .................. 10-2013-0167876

(51) Int. Cl.
*G06F 17/30*     (2006.01)
*G06F 17/27*     (2006.01)

(52) U.S. Cl.
CPC ...... *G06F 17/30616* (2013.01); *G06F 17/278* (2013.01); *G06F 17/30539* (2013.01)

(58) Field of Classification Search
CPC .................. G06F 17/30539; G06F 17/30616
(Continued)

(56) References Cited

U.S. PATENT DOCUMENTS 6,321,191 B1 * 11/2001 Kurahashi ........... G06F 17/2765
704/7

6,366,908 B1 * 4/2002 Chong .............. G06F 17/30616
(Continued)

FOREIGN PATENT DOCUMENTS

| KR | 1020000024179 | 5/2000 |
| KR | 100847376 | 7/2008 |
| KR | 101061391 | 1/2010 |
| KR | 100989581 | 10/2010 |

OTHER PUBLICATIONS

Muhammad Abulaish, Lipika Dey, "Biological relation extraction and query answering from MEDLINE abstracts using ontology-based text mining", Data & Knowledge Engineering, vol. 61, Issue 2, 2007, pp. 228-262, ISSN 0169-023X.*

(Continued)

*Primary Examiner* — Mark E Hershley
(74) *Attorney, Agent, or Firm* — Brundidge & Stanger, P.C.

(57) ABSTRACT

In one example embodiment, a server may divide documents into a plurality of morphological segments, parse, from the plurality of morphological segments, a plurality of named biological entities, tag the plurality of named biological entities and the plurality of morphological segments, generate a database that includes the tagged named biological entities and the tagged morphological segments, receive a first search term including one or more of the tagged named biological entities or one or more of the tagged morphological segments, search the database for at least one result phrase that includes at least one occurrence of the first search term, receive an input to retrieve a second search term including at least one morphological segment from one of the result phrases, store the second search term as a mining search term, and mine for the one or more documents based on the mining search term.

18 Claims, 6 Drawing Sheets

(58) Field of Classification Search
USPC .................................................. 707/776, 755
See application file for complete search history.

(56) References Cited

U.S. PATENT DOCUMENTS

| | | | | |
|---|---|---|---|---|
| 7,836,004 | B2* | 11/2010 | Roth ................. | G06F 17/30303 |
| | | | | 706/47 |
| 8,935,277 | B2* | 1/2015 | Kuchmann-Beauger ............ | G06F 17/30958 |
| | | | | 707/769 |
| 2006/0053154 | A1* | 3/2006 | Yano ................... | G06F 17/3097 |
| 2006/0206463 | A1* | 9/2006 | Takachio .......... | G06F 17/30654 |
| 2008/0270120 | A1* | 10/2008 | Pestian ............... | G06F 17/2785 |
| | | | | 704/9 |
| 2009/0024572 | A1* | 1/2009 | Mehta ............... | G06F 17/30463 |
| 2009/0228445 | A1* | 9/2009 | Gangal ............ | G06F 17/30539 |
| 2009/0319518 | A1* | 12/2009 | Koudas ............ | G06F 17/30696 |
| 2010/0082673 | A1* | 4/2010 | Nakano ............... | G06F 17/3089 |
| | | | | 707/776 |
| 2011/0182937 | A1* | 7/2011 | Banchereau ........... | A61K 39/21 |
| | | | | 424/208.1 |

OTHER PUBLICATIONS

Kyung-Mi Park et al., "A Bio-Text Mining System Based on Natural Language Processing", Journal of KIISE: Computing Practices and Letters vol. 17, No. 4, Apr. 2011.

* cited by examiner

125

BIOLOGY-RELATED DATA MINING

TECHNICAL FIELD

The embodiments described herein pertain generally to data mining for biology-related data.

BACKGROUND

In general, biology-related documents may contain a lot of professional, abstruse, and complex materials that are not easy for novices to identify, much less access. Thus, it is difficult to retrieve from biology-related documents using general search terms.

SUMMARY

In one example embodiment, a method performed under control of a server may include: dividing one or more biology-related documents into a plurality of morphological segments; parsing, from the plurality of morphological segments, a plurality of named biological entities; tagging the plurality of named biological entities and one or more of the plurality of morphological segments; generating a database that includes the tagged named biological entities and the tagged morphological segments; receiving, from a user device, a first search term including one or more of the tagged named biological entities or one or more of the tagged morphological segments; searching the database for at least one result phrase that includes at least one occurrence of the first search term; receiving, from the user device, an input to retrieve a second search term including at least one morphological segment from one of the search result phrases; storing the second search term as a mining search term; and mining for the one or more biology-related documents based on the mining search term received from the user device.

In another example embodiment, a server may include: a morpheme divider configured to divide one or more biology-related documents into a plurality of morphological segments; a parsing component configured to parse, from the plurality of morphological segments, a plurality of named biological entities; a tagging component configured to tag the plurality of named biological entities and one or more of the plurality of morphological segments; a database generator configured to generate a database that includes the tagged named biological entities and the tagged morphological segments; an input receiver configured to receive, from a user device, a first search term including one or more of the tagged named biological entities or one or more of the tagged morphological segments; a searching component configured to search the database for at least one result phrase that includes at least one occurrence of the first search term; an input receiver configured to receive, from the user device, an input to retrieve a second search term including at least one morphological segment from one of the search result phrases; a storing component configured to store the second search term as a mining search term; and a mining component configured to mine for the one or more biology-related documents based on the mining search term received from the user device.

In yet another example embodiment, a computer-readable storage medium having thereon computer-executable instructions that, in response to execution, cause a device to perform operations that include: dividing one or more biology-related documents into a plurality of morphological segments; parsing, from the plurality of morphological segments, a plurality of named biological entities; tagging the plurality of named biological entities and one or more of the plurality of morphological segments; generating a database that includes the tagged named biological entities and the tagged morphological segments; receiving, from a user device, a first search term including one or more of the tagged named biological entities or one or more of the tagged morphological segments; searching the database for at least one result phrase that includes at least one occurrence of the first search term; receiving, from the user device, an input to retrieve a second search term including at least one morphological segment from one of the search result phrases; storing the second search term as a mining search term; and mining for the one or more biology-related documents based on the mining search term received from the user device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
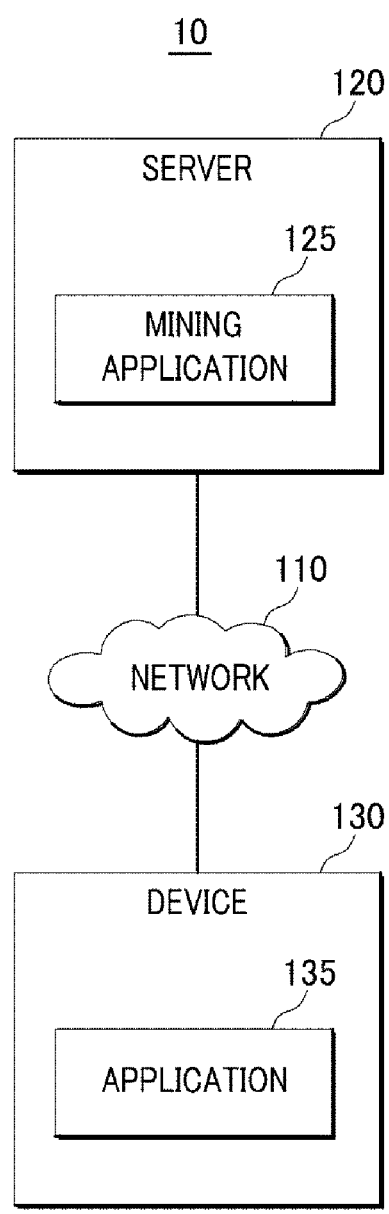
FIG. 1 shows an example system in which one or more embodiments of biology-related data mining may be implemented, in accordance with various embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 10 in which one or more embodiments of biology-related data mining may be implemented, in accordance with various embodiments described herein. As depicted in FIG. 1, system 10 may include, at least, a server 120, and a device 130. At least server 120 and device 130 may be communicatively connected to each other via a network 110.

Network 110 may be a wired or wireless information or telecommunications network. Non-limiting examples of network 110 may include a wired network such as a LAN (Local Area Network), a WAN (Wide Area Network), a VAN (Value Added Network), a telecommunications cabling system, a fiber-optics telecommunications system, or the like. Other non-limiting examples of network 110 may include wireless networks such as a mobile radio communication network, including at least one of a 3$^{rd}$, 4$^{th}$ or 5th generation mobile telecommunications network (3G), (4G), or (5G); various other mobile telecommunications networks; a satellite network; WiBro (Wireless Broadband Internet); Mobile WiMAX (Worldwide Interoperability for Microwave Access); HSDPA (High Speed Downlink Packet Access); or the like.

Server 120 may be a processor-enabled computing device that hosts an instance of mining application 125 that is configured to receive a mining search term from device 130 and mine for biology-related documents based on the mining search term. The mining for biology-related documents may be a computational process for discovering patterns in large data sets and database systems, which may or may not be exclusively biology-related. For example, sought-after biology-related documents may be internet-accessible biology-related information stored in a plurality of databases or intranet-accessible biology-related information stored in one or more databases for a university, a company, a research laboratory, etc.

In some embodiments, mining application 125 may be configured or operable to divide one or more biology-related documents into a plurality of morphological segments by exploiting a natural language processing scheme (NLP). The morphological segments may be the smallest grammatical unit in a language, or the smallest meaningful unit of a language. A morphological segment may not be identical to a word, and a difference between the two is that a morphological segment may or may not stand alone; whereas a word, by definition, is freestanding. When the word stands by itself, it is considered a root because it has a meaning of its own, e.g., the morpheme "genome," and when the word depends on another morphological segment to express an idea, the word is an affix because the affix has a grammatical function, e.g., the "s" in "genomes" to indicate that it is plural. A sentence may comprise one or more morphological segments.

Further, the aforementioned natural language processing scheme may refer to a scheme developed in a field of computer science, artificial intelligence, and linguistics concerned with interactions between computers and human languages. As such, NLP may be related to the area of human—computer interaction.

Before dividing the biology-related documents into a plurality of morphological segments, mining application 125 may divide the biology-related documents into a plurality of sentences by utilizing NLP, and further divide the respective sentences into a plurality of morphological segments with reference to a morphological segment dictionary in server 120 that stores a list of morphological segments.

Mining application 125 may be configured or operable to parse, after dividing the biology-related documents into the plurality of morphological segments, a plurality of named biological entities based on a list of named biological entities stored in server 120. That is, mining application 125 may generate, based on multiple biology-related sources, e.g., articles, academic papers, or publications, the list of named biological entities that may include terms or phrases pertaining to genetics, diseases, variations etc., that may distinguish biological objects.

By comparing each of the plurality of morphological segments to the list of named biological entities, mining application 125 may extract, from the plurality of morphological segments, one or more named biological entities that match with the list of named biological entities. For example, if the plurality of morphological segments includes "aspirin" and the list of named biological entities also include "aspirin", then mining application 125 may extract "aspirin" from the plurality of morphological segments.

In other words, this process may be referred to as named-entity recognition, which may be a subtask of information extraction that may seek to locate and classify one or more morphological segments in text into pre-defined named biological entities referring to, e.g., genes, diseases, variations, drugs, etc.

Mining application 125 may be configured or operable to tag, after parsing the plurality of named biological entities, each of the respective named biological entities as a named entity. That is, mining application 125 may categorize each of the respective named biological entities as a named entity. After such tagging, the named biological entities may be distinguishable from other morphological segments.

Mining application 125 may be configured or operable to assign a name and a morphological segment to each of the respective morphological segments except for the extracted named biological entities, by comparing the respective morphological segments to a list of morphological segments and their categories, e.g., nouns, adverbs, adjective, verbs, prepositions, pronouns, determiners, conjunctions, etc., included in a morphological segment dictionary.

Non-limiting examples of the names that may be assigned to each of the respective morphological segments may be nouns, adverbs, adjective, verbs, prepositions, pronouns, determiners, conjunctions, etc. Then, mining application 125 may generate a database that includes the tagged named biological entities, e.g., "named entity," and the tagged morphological segments, e.g., "noun and morphological segment," "preposition and morphological segment," etc.

Mining application 125 may receive, from the user interface on device 130, a first search term including one or more of the named biological entities and/or one or more of the morphological segments to search for the search result phrases including the first search term. As referenced herein, a "search term" may include one or more actual terms. In such instance, a "search term" may then be regarded as a "search phrase." Thus, for the sake of simplicity in the present description, it is to be understood that "search term" may be used in reference to either a search term or a search phrase. Regardless, mining application 125 may then parse, based on the tags stored in the database, e.g., "named entity" or "noun and morphological segment," etc., the first search term to be interpreted as a sequence of one or more occurrences of "named entity" or one or more occurrences of "morphological segment".

As a non-limiting example of the sequence, if mining application 125 receives a user input including search terms from device 130 such as "gene, biomarker, breast cancer," mining application 125 may parse the search terms to be interpreted as a sequence of "named biological entity 1, morphological segment 1, named biological entity 2," because gene and breast cancer are tagged as a "named entity" and biomarker is tagged as a "morphological segment."

In addition, mining application 125 may be configured or operable to predefine a plurality of parsed search sequences including, e.g., a sequence of "named biological entity 1, morphological segment 1, named biological entity 2" and a search command corresponding to each of the parsed search sequences. As a non-limiting example of the search command, mining application 125 may first predefine a sequence of "named biological entity 1, morphological segment 1, named biological entity 2" as a parsed search sequence, which may command mining application 125 to search for all occurrences of "named biological entity 1" associated with "morphological segment 1" and "named biological entity 2" (search command).

As an example of search terms, when mining application 125 receives a search phrase from device 130 such as "gene, biomarker, breast cancer," mining application 125 may identify that gene, biomarker, and breast cancer may be parsed as "named entity," "morphological segment" and "named entity," respectively in accordance with the tags and the corresponding morphological segments stored in server 120.

Then, mining application 125 may utilize the search phrase to search the database for all occurrences of "gene" associated with "biomarker" and "breast cancer" based on the parsed search sequence. After searching the database, mining application 125 may transmit, to the user interface on device 130, a plurality of search result phrases including all occurrences of "gene" associated with "biomarker" and "breast cancer." Upon receipt of the search result phrases, device 130 may display the plurality of result phrases on a user interface, including e.g., " . . . HER2 (gene) biomarker (morphological segment) for breast cancer (disease) . . . ."

In addition, while searching for the plurality of search result phrases based on the first search term, mining application 125 may measure and record a time required for the search in the database. Based on the measured time, mining application 125 may determine an accuracy of the first search term by comparing the time required for the searching based on the first search term to the time required for the search based on other search terms.

For example, if the search for the search result phrases based on the first search term takes one second, whereas a search based on other search terms takes two seconds, then mining application 125 may determine that the first search term is more accurate than other search terms in terms of producing search results. That is, if a search term is comparatively accurate, the search based on the comparatively accurate search term may take less time than other search terms that are comparatively inaccurate.

Mining application 125 may be configured or operable to receive, from device 130, a user input to retrieve a second search term from one of the search phrases and store the second search term as mining search term in the generated database, after searching the plurality of search result phrases. Upon receipt of the user input, mining application 125 may select and add some phrases from among the search result phrases in accordance with a predefined formula for retrieving search terms.

As a non-limiting example of such predefined formula, mining application 125 may select one of the search result phrases that occurs most frequently. If the selected search result phrase includes a sequence of "gene, morphological segment, disease," then mining application 125 may select and add "gene" and "disease" from among the sequence to constitute a second search term if a morphological segment exists between named biological entities.

In such a manner, server 120 may store a plurality of mining search terms that may be also provided to a user as reference mining terms. As an example of the second search term, mining application 125 may retrieve the second search term such as "HER 2, Breast Cancer" from among the sequence of " . . . HER2 (gene) biomarker (morphological segment) for breast cancer (disease) . . . ."

Mining application 125 may be configured to search, from the database, a plurality of search result phrases including the second search term, and transmit the plurality of search result phrases to device 130, after retrieving the second search term. Then, device 130 may display the plurality of search result phrases on user interface, e.g., " . . . HER2 in relation to breast-cancer . . . ," "Role of HER2 in breast-cancer," and " . . . HER2 prognostic for breast-cancer . . . " etc.

Further, mining application 125 may receive a user input to retrieve a third search term from one of the plurality of search result phrases from device 130. A non-limiting example of the third search term may include "GENE in relation to BREAST CANCER" retrieved from " . . . HER2 in relation to breast-cancer . . . " in accordance with a predefined formula. The formula may indicate that if the result includes a sequence of "gene, preposition, disease," then server may constitute the search term that may include a sequence of "GENE, preposition, disease."

Server 120 may store the third search term of "GENE, in relation to, BREAST CANCER" as mining search term in the database of server 120. In such a manner, server 120 may store in the database a plurality of mining search terms.

In some other embodiments, mining application 125 may receive a named biological entity from device 130. Then, mining application 125 may search on the list of named biological entities for a different named biological entity having a same meaning as the received named biological entity. Further, mining application 125 may transmit to device 130 the different named biological entity having the same meaning as the received named biological entity. After device 130 receives the different named biological entity, device 130 may display the different named biological entity on the user interface.

Thus, FIG. 1 shows an example system 10 in which one or more embodiments of a biology-related data mining may be implemented, in accordance with various embodiments described herein.

Figure 2:
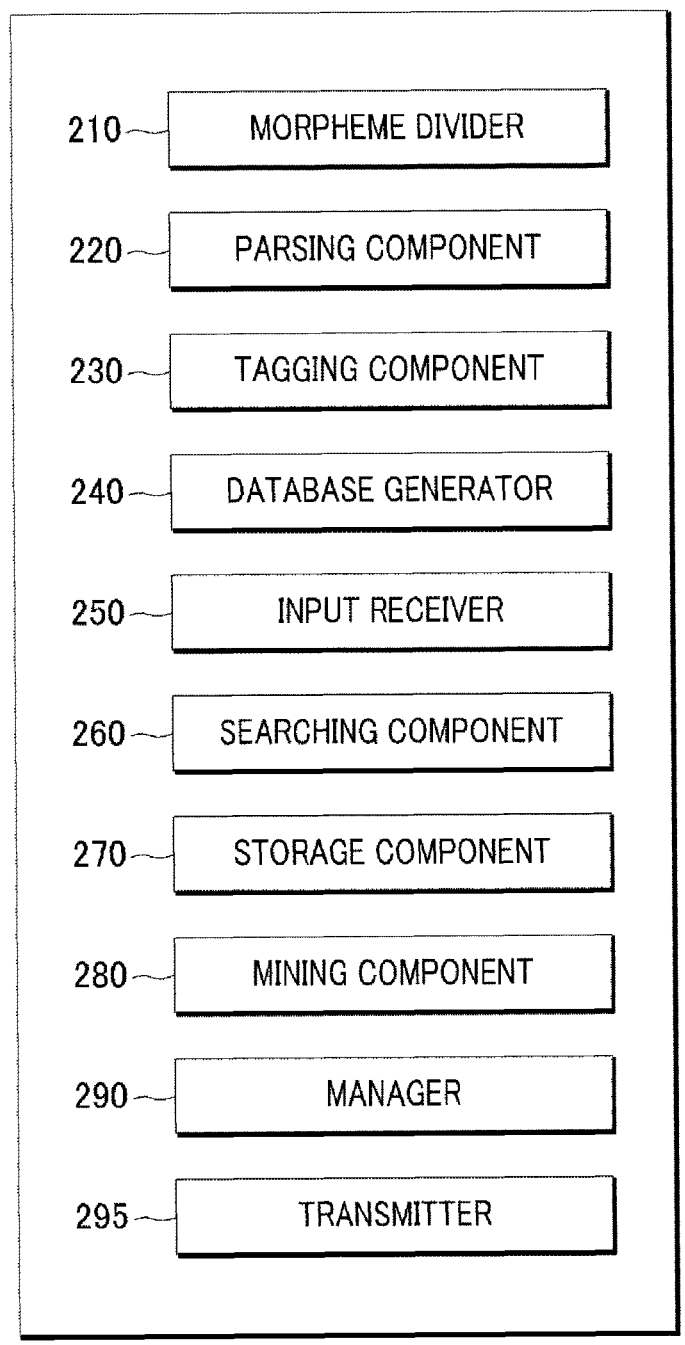
FIG. 2 shows an example application by which at least portions of biology-related data mining may be implemented, in accordance with various embodiments described herein.

FIG. 2 shows an example application by which at least portions of biology-related data mining may be implemented, in accordance with various embodiments described herein. As depicted in FIG. 2, mining application 125 that is hosted, run, and/or executed on server 120 may include a morpheme divider 210 configured to divide one or more biology-related documents into a plurality of morphological segments; a parsing component 220 configured to parse, from the plurality of morphological segments, a plurality of named biological entities; a tagging component 230 configured to tag the plurality of named biological entities and one or more of the plurality of morphological segments; a database generator 240 configured to generate a database that includes the tagged named biological entities and the tagged morphological segments; an input receiver 250 configured to receive, from a user device, a first search term including one or more of the tagged named biological entities or one or more of the tagged morphological segments; a searching component 260 configured to search the database for at least one search result phrase that includes at least one occurrence of the first search term; an input receiver 250 configured to receive, from the user device, an input to retrieve a second search term including at least one morphological segment from one of the search result phrases; a storing component 270 configured to store the second search term as a mining search term; and a mining component 280 configured to mine for the one or more biology-related documents based on the mining search term received from the user device.

In some embodiments, morpheme divider 210 may be configured to divide one or more biology-related documents into a plurality of morphological segments by exploiting a natural language processing (NLP) scheme. The morphological segments may be the smallest grammatical unit in a language or the smallest meaningful unit of a language.

Before dividing the biology-related documents into a plurality of morphological segments, morpheme divider 210 may divide the biology-related documents into a plurality of sentences by utilizing NLP, and further divide the respective sentences into a plurality of morphological segments with reference to a morphological segment dictionary in server 120 that stores a list of morphological segments. That is, if a sentence includes a plurality of segments included in the morphological segment dictionary, then morpheme divider 210 may divide the respective sentences into a plurality of morphological segments.

Parsing component 220 may be configured to parse, after dividing the biology-related documents into the plurality of morphological segments, a plurality of named biological entities based on a list of named biological entities stored in server 120. Parsing component 220 may extract, from the plurality of morphological segments, one or more named biological entities that match the list of named biological entities.

Tagging component 230 may be configured to tag, after parsing the plurality of named biological entities, each of the respective named biological entities as a named entity by generating metadata describing the respective named biological entities as a named entity. That is, tagging component 230 may categorize each of the respective named biological entities as a named entity. After such tagging, the named biological entities may be distinguishable from other morphological segments.

Database generator 240 may be configured to generate a database that includes the tagged named biological entities, e.g., "named entity," and the tagged morphological segments, e.g., "noun and morphological segment," "preposition and morphological segment," etc. To generate the database, database generator 240 may generate a data table in which the tagged named biological entities and the tagged morphological segments may be recorded.

Input receiver 250 may be configured to receive, from application 135 on device 130, a first search term including one or more of the named biological entities and/or one or more of the morphological segments to search for the search result phrases including the first search term. Input receiver 250 may also receive, from application on device 130, a user input to retrieve a second search term from one of the search phrases and to store the second search term as mining search term in the generated database, after searching the plurality of search result phrases.

Searching component 260 may be configured to search the database for all occurrences of search result phrases including the first search term. For example, if the first search term includes "gene, biomarker, breast cancer," search component 260 may search the database for all occurrences of "gene" associated with "biomarker" and "breast cancer" based on the parsed search sequence, after "gene, biomarker, breast cancer" may be parsed as a sequence of "named biological entity 1, morphological segment 1, named biological entity 2".

Storage component 270 may be configured to store a plurality of mining search terms that may be also provided to a user as reference mining terms.

Mining component 280 may be configured to mine for the one or more biology-related documents based on the mining search term received from the user device. That is, mining component 280 may extract a plurality of sentences including the mining search term from the one or more biology-related documents, and may further generate statistics on the frequency of term or phrase that occurs in the plurality of sentences.

Manager 290 may measure and record a time required for completion of the search in the database (that is, manager 290 may record a sending time to send a query and a receiving time to receive response corresponding to the query and calculate the time difference between the sending time and the receiving time; and, based on the measured time, manager 290 may determine an accuracy of the first search term by comparing the time required for the search based on the first search term to the time required for the search based on other search terms. For example, if the search for the search result phrases based on the first search term takes one second, whereas a search based on other search terms takes two seconds, then manger 290 may determine that the first search term is more accurate than other search terms in terms of producing search results. That is, if a search term is comparatively accurate, which may be determined by comparing the time required for the search based on the search term to the time required for the search based on other search terms, the search based on the comparatively accurate search term may take less time. Thus, in accordance with at least some embodiments, accuracy may be a relative measure.

Transmitter 295 may be configured to transmit the plurality of search result phrases to device 130 using near-field communications protocol devices, e.g., Bluetooth® or using a short-range, e.g., wire replacement, communication technology. Further, transmitter 295 may transmit to device 130 the different named biological entity having the same meaning as the received named biological entity.

Thus, FIG. 2 shows an example application by which at least portions of biology-related data mining may be implemented, in accordance with various embodiments described herein.

Figure 3:
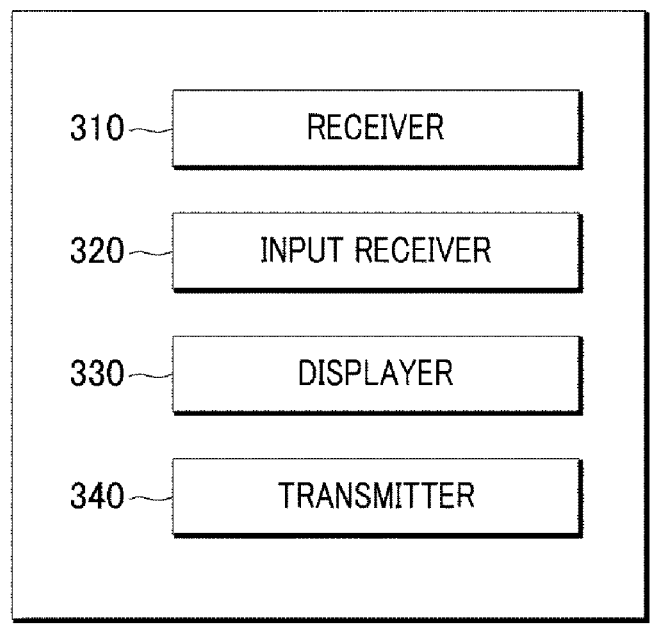
FIG. 3 shows an example application by which at least portions of biology-related data mining may be implemented, in accordance with various embodiments described herein.

FIG. 3 shows an example application by which at least portions of biology-related data mining may be implemented, in accordance with various embodiments described herein. For example, as depicted in FIG. 3, application 135 that is hosted, executable, and/or operable on device 130 may include a receiver 310 configured to receive a plurality of search result phrases including all occurrences of search terms transmitted from mining application 125 on server 120, a input receiver 320 configured to receive a user input that includes one or more of the named biological entities and/or one or more of the morphological segments to search for the search result phrases that include the first search term, a displayer 330 configured to display the search result phrases transmitted from mining application 125 on server 120, and a transmitter 340 configured to transmit a search phrase that include one or more of the named biological entities and/or one or more of the morphological segments.

In some embodiments, receiver 310 may be configured to receive a plurality of search result phrases including all occurrences of search phrases transmitted after mining application 135 on server 120 searches the database for the result phrases and generates the plurality of result phrases from the database.

Input receiver 320 may be configured to receive a user input that includes a search phrase used to search for the search result phrases including the search phrase, that is, by receiving a query transmitted from device 130 through a network, wirelessly connected or cable connected.

Display 330 may be configured to display, on a user interface, the search result phrases received by input receiver 320 from mining application 135 on server 120.

Using near-field communications protocol devices, e.g., Bluetooth® or using a short-range, e.g., wire replacement, communication technology, transmitter 340 may be configured to transmit, to mining application 135 on server 120, a search phrase, e.g., "gene, biomarker, breast cancer" to be parses as a sequence of "named biological entity 1, morphological segment 1, named biological entity 2."

Thus, FIG. 3 shows an example application by which at least portions of a biology-related data mining may be implemented, in accordance with various embodiments described herein.

Figure 4:
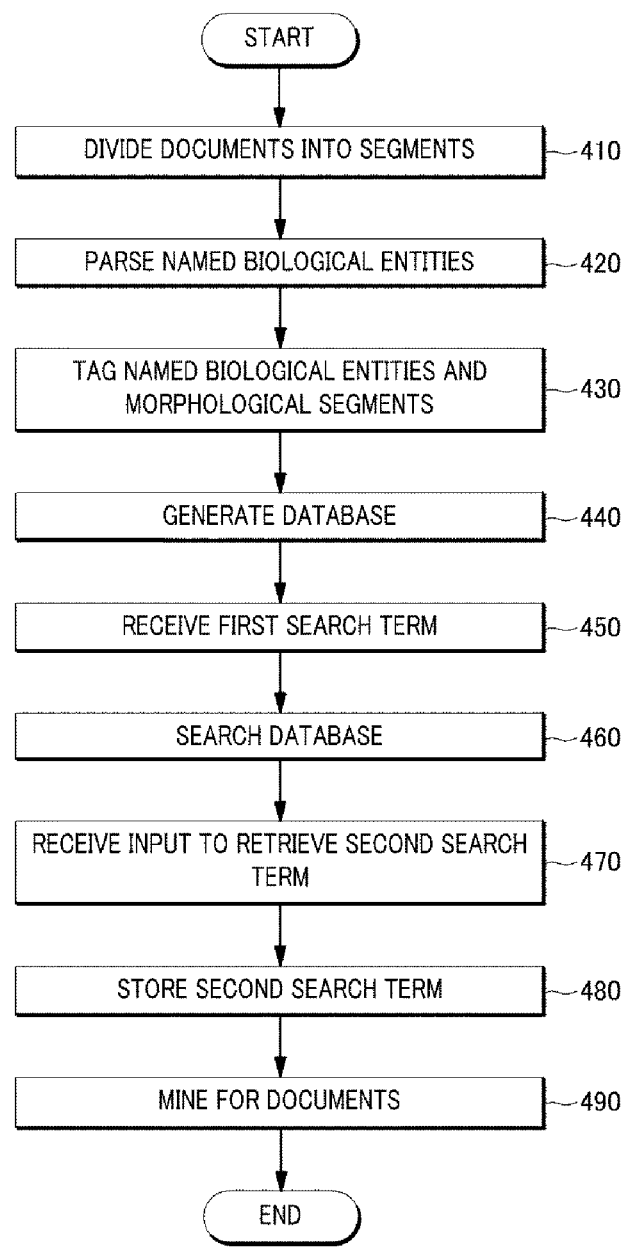
FIG. 4 shows an example processing flow of operations, by which at least portions of biology-related data mining may be implemented, in accordance with various embodiments described herein.

FIG. 4 shows an example processing flow of operations, by which at least portions of biology-related data mining may be implemented, in accordance with various embodiments described herein. The operations of processing flow 400 may be implemented in system configuration 10 including network 110, server 120, and device 130, as illustrated and described with regard to FIG. 1.

Processing flow 400 may include one or more operations, actions, or functions as illustrated by one or more blocks 410, 420, 430, 440, 450, 460, 470, 480 and/or 490. Although illustrated as discrete blocks, various blocks may be divided into additional blocks, combined into fewer blocks, or eliminated, depending on the desired implementation. Processing may begin at block 410.

Block 410 (Divide Documents Into Segments) may refer to morpheme divider 210 dividing one or more biology-related documents into a plurality of morphological segments by exploiting a natural language processing scheme (NLP). Processing may proceed from block 410 to block 420.

Block 420 (Parse Named Biological Entities) may refer to parsing component 220 parsing the plurality of named biological entities, based on a list of named biological entities stored in server 120. That is, server 120 may generate, based on multiple biology-related sources, e.g., articles, academic papers, or publications, the list of named biological entities that may include terms or phrases pertaining to genetics, diseases, variations etc., that may distinguish biological objects. Processing may proceed from block 420 to block 430.

Block 430 (Tag Named Biological Entities And Morphological Segments) may refer to tagging component 230 tagging one or more of the respective named biological entities as a named entity. That is, server 120 may categorize one or more of the respective named biological entities as a named entity. Further, server 120 may assign a name and a morphological segment to each of the respective morphological segments, except for the extracted named biological entities, by comparing the respective morphological segments to a list of morphological segments and their categories, e.g., nouns, adverbs, adjective, verbs, prepositions, pronouns, determiners, conjunctions, etc., included in a morphological segment dictionary. Processing may proceed from block 430 to block 440.

Block 440 (Generate Database) may refer to database generator 240 generating a database that includes the tagged named biological entities and the tagged morphological segments by generating a data table in which the tagged named biological entities and the tagged morphological segments may be recorded. Processing may proceed from block 440 to block 450.

Block 450 (Receive First Search Term) may refer to input receiver 250 receiving, transmitted from device 130, a first search term that includes one or more of the named biological entities and/or one or more of the morphological segments to search for the result phrases including the first search term by receiving a query including the first search term. Then, parsing component 220 may parse, based on the tags stored in the database, e.g., "named entity" or "noun and morphological segment," etc., the first search term to be interpreted as a sequence of one or more occurrences of "named entity" or one or more occurrences of "morphological segment". Processing may proceed from block 450 to block 460.

Block 460 (Search Database) may refer to searching component 260 searching the database for all occurrences of "named entity" associated with the other "named entity" and "morphological segment" based on the parsed search sequence. Processing may proceed from block 460 to block 470.

Block 470 (Receive Input To Retrieve Second Search Term) may refer to input receiver 250 receiving a user input instruction to retrieve a second search term from one of the search phrases by receiving a query that includes the user input instruction. Upon receipt of the user input, manager 290 may select and add some phrases from among the result phrases in accordance with a predefined formula for retrieving search terms. Processing may proceed from block 470 to block 480.

Block 480 (store second search term) may refer to storage component 270 storing the second search term as mining search term in the generated database. Processing may proceed from block 470 to block 480.

Block 490 (mine for documents) may refer to mining component 290 mining for the one or more biology-related documents based on the mining search term received from the user device.

Thus, FIG. 4 shows an example processing flow of operations, by which at least portions of a biology-related data mining may be implemented, in accordance with various embodiments described herein.

Figure 5:
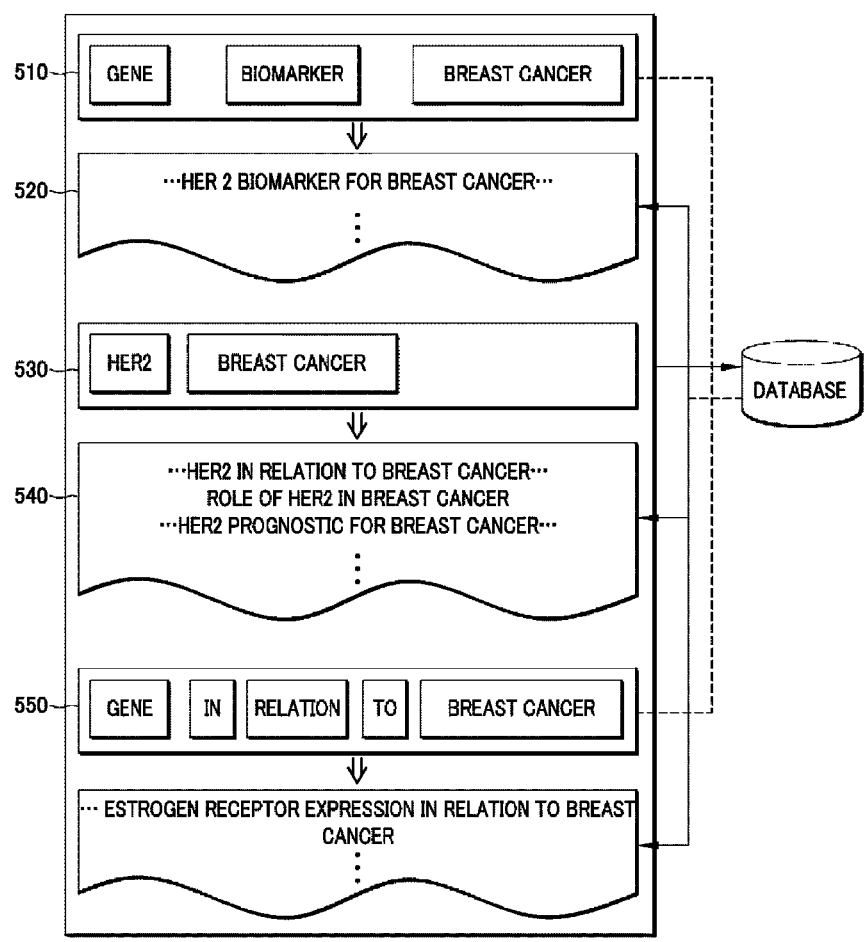
FIG. 5 shows an example interface implemented by at least portions of biology-related data mining, in accordance with various embodiments described herein.

FIG. 5 shows an example interface implemented by at least portions of biology-related data mining, in accordance with various embodiments described herein. As depicted in FIG. 5, input receiver 250 receives a user input including search terms from device 130 such as "gene, biomarker, breast cancer" 510. Then, parsing component 220 may parse the search terms to be interpreted as a sequence of "named biological entity 1, morphological segment 1, named biological entity 2," because the above tagging may make gene and breast cancer tagged as "named entity," and make biomarker tagged as "morphological segment".

In addition, manager 290 may predefine a plurality of parsed search sequences including, e.g., a sequence of "named biological entity 1, morphological segment 1, named biological entity 2" and a search command corresponding to each of the parsed search sequences. As a non-limiting example of the search command, manager 290 may first predefine a sequence of "named biological entity 1, morphological segment 1, named biological entity 2" as a parsed search sequence, which may command searching component 260 to search for all occurrences of "named biological entity 1" associated with "morphological segment 1" and "named biological entity 2" (search command).

Searching component 260 may be commanded to search the database for all occurrences of "gene" associated with "biomarker" and "breast cancer" based on the parsed search sequence. After searching the database, transmitter 295 may transmit, to device 130, a plurality of result phrases including all occurrences of "gene" associated with "biomarker" and "breast cancer." Upon receipt of the result phrases, display 330 may display the plurality of result phrases on a user interface, including e.g., " . . . HER2 (gene) biomarker (morphological segment) for breast cancer (disease) . . . " 520.

Searching component 260 may select one of the result phrases that occur most frequently. If the selected result phrase includes a sequence of "gene, morphological segment, disease," then searching component 260 may select and add "gene" and "disease" from among the sequence to constitute a second search term if a morphological segment exists between named biological entities.

In such a manner, storage component 270 may store a plurality of mining search terms that may be also provided to a user as reference mining terms. As an example of the second search term, searching component 260 may retrieve the second search term such as "HER 2, Breast Cancer" 530 from among the sequence of " . . . HER2 (gene) biomarker (morphological segment) for breast cancer (disease) . . . " 520.

Searching component 260 may be configured to search, from the database, a plurality of result phrases including the second search term, and transmitter 295 may transmit the plurality of result phrases to device 130, after retrieving the second search term. Then, display 330 may display the plurality of result phrases on user interface, e.g., " . . . HER2 in relation to breast-cancer . . . ," "Role of HER2 in breast-cancer," and " . . . HER2 prognostic for breast-cancer . . . ," etc 540.

Further, input receiver 250 may receive a user input to retrieve a third search term from one of the plurality of result phrases from device 130. A non-limiting example of the third search term may include "GENE in relation to BREAST CANCER" 550 retrieved from " . . . HER2 in relation to breast-cancer . . . " in accordance with a predefined formula. The formula may indicate that if the result includes a sequence of "gene, preposition, disease," then server may constitute the search term that may include a sequence of "GENE, preposition, disease."

Storage component 270 may store the third search term of "GENE, in relation to, BREAST CANCER" as mining search term in the database of server 120. In such a manner, Storage component 270 may store in the database a plurality of mining search terms.

Thus, FIG. 5 shows an example interface implemented by at least portions of a biology-related data mining, in accordance with various embodiments described herein.

Figure 6:
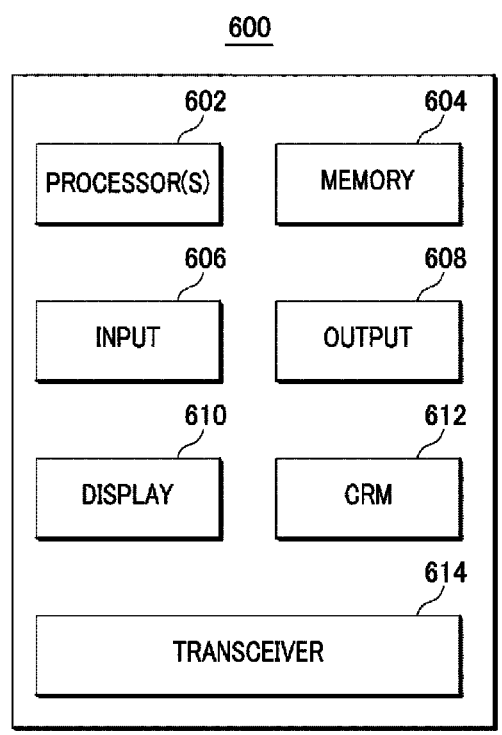
FIG. 6 shows an illustrative computing embodiment, in which any of the processes and sub-processes of biology-related data mining may be implemented as computer-readable instructions stored on a computer-readable medium, in accordance with various embodiments described herein.

FIG. 6 shows an illustrative computing embodiment, in which any of the processes and sub-processes of a biology-related data mining may be implemented as computer-readable instructions stored on a computer-readable medium, in accordance with various embodiments described herein. The computer-readable instructions may, for example, be executed by a processor of a device, as referenced herein, having a network element and/or any other device corresponding thereto, particularly as applicable to the applications and/or programs described above corresponding to the configuration 10 for transactional permissions.

In a very basic configuration, a computing device 600 may typically include, at least, one or more processors 602, a system memory 604, one or more input components 606, one or more output components 608, a display component 610, a computer-readable medium 612, and a transceiver 614.

Processor 602 may refer to, e.g., a microprocessor, a microcontroller, a digital signal processor, or any combination thereof.

Memory 604 may refer to, e.g., a volatile memory, non-volatile memory, or any combination thereof. Memory 604 may store, therein, an operating system, an application, and/or program data. That is, memory 604 may store executable instructions to implement any of the functions or operations described above and, therefore, memory 604 may be regarded as a computer-readable medium.

Input component 606 may refer to a built-in or communicatively coupled keyboard, touch screen, or telecommunication device. Alternatively, input component 606 may include a microphone that is configured, in cooperation with a voice-recognition program that may be stored in memory 604, to receive voice commands from a user of computing device 600. Further, input component 606, if not built-in to computing device 600, may be communicatively coupled thereto via short-range communication protocols including, but not limitation, radio frequency or Bluetooth.

Output component 608 may refer to a component or module, built-in or removable from computing device 600, that is configured to output commands and data to an external device.

Display component 610 may refer to, e.g., a solid state display that may have touch input capabilities. That is, display component 610 may include capabilities that may be shared with or replace those of input component 606.

Computer-readable medium 612 may refer to a separable machine readable medium that is configured to store one or more programs that embody any of the functions or operations described above. That is, computer-readable medium 612, which may be received into or otherwise connected to a drive component of computing device 600, may store executable instructions to implement any of the functions or operations described above. These instructions may be complimentary or otherwise independent of those stored by memory 604.

Transceiver 614 may refer to a network communication link for computing device 600, configured as a wired network or direct-wired connection. Alternatively, transceiver 614 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

Thus, FIG. 6 shows an illustrative computing embodiment, in which any of the processes and sub-processes of a biology-related data mining may be implemented as computer-readable instructions stored on a computer-readable medium, in accordance with various embodiments described herein.

We claim:

1. A method performed under control of a server, comprising:
dividing, by the server, one or more biology-related documents into a plurality of morphological segments based on a natural language processing (NLP) scheme;
parsing, by the server, a plurality of named biological entities from the plurality of morphological segments;
tagging, by the server, each of the plurality of named biological entities with a named entity including any one of a gene, disease, variation or drug;
tagging, by the server, one or more of the plurality of morphological segments as a morphological segment;
generating, by the server, a biology-related source database that includes the tagged named biological entities and the tagged morphological segments;
receiving, from a user device, by the server, a first search term including one or more of the tagged named biological entities and one or more of the tagged morphological segments;
searching, by the server, the biology-related source database for one or more first search result phrases that include at least one occurrence of the first search term;
receiving, from the user device by the server, an input to retrieve a second search term from the one or more first search result phrases;
generating, by the server, the second search term from one of the one or more first search result phrases, wherein the generating comprises:
identifying the tagged named biological entities and the tagged morphological segments from the one of the one or more first search result phrases,
determining an occurrence order of the identified tagged named biological entities and the tagged morphological segments in the one of the one or more first search result phrases,
selecting, based on the determined occurrence order, one or more of the named biological entities or the morphological segments from the one of the one or more first search result phrases, and
generating the second search term to include the selected one or more of the named biological entities or the morphological segments;
storing, by the server, the second search term as a mining search term; and
mining, by the server, for the one or more biology-related documents based on the mining search term received from the user device.

2. The method of claim 1, wherein the dividing includes:
dividing the one or more biology-related documents into a plurality of sentences; and
dividing the respective sentences into the plurality of morphological segments.

3. The method of claim 1, wherein the parsing includes:
generating a list of named biological entities;
storing the list of named biological entities; and
parsing, from the plurality of morphological segments, the plurality of named biological entities based on the list of named biological entities,
wherein the list of named biological entities respectively correspond to one or more of genomes, diseases variations, or drugs.

4. The method of claim 3, further comprising:
receiving one of the list of named biological entities from the user device;
searching on the list of named biological entities for a different named biological entity having a same meaning as the named biological entity; and
transmitting, to the user device, the different named biological entity having a same meaning as the named biological entity.

5. The method of claim 1, wherein the searching includes measuring a time required for the searching.

6. The method of claim 5, further comprising:
determining, based on the measured time, an accuracy of the first search term.

7. The method of claim 1, wherein the tagging includes assigning a name to each of the one or more of the plurality of morphological segments.

8. The method of claim 1, further comprising:
searching, from the biology-related source database, a plurality of second search result phrases including the second search term; and
receiving, from the user device, an input to retrieve a third search term from one of the plurality of second search result phrases including the second search term.

9. A server, comprising:
a morpheme divider configured to divide one or more biology-related documents into a plurality of morphological segments based on a natural language processing (NLP) scheme;
a parsing component configured to parse a plurality of named biological entities from the plurality of morphological segments;
a tagging component configured to:
tag each of the plurality of named biological entities with a named entity including any one of a gene, disease, variation or drug, and
tag one or more of the plurality of morphological segments as a morphological segment;
a database generator configured to generate a biology-related source database that includes the tagged named biological entities and the tagged morphological segments;
an input receiver configured to receive, from a user device, a first search term including one or more of the tagged named biological entities and one or more of the tagged morphological segments;
a searching component configured to search the biology-related source database for one or more first search result phrases that include at least one occurrence of the first search term;
an input receiver configured to receive, from the user device, an input to retrieve a second search term from the one or more first search result phrases;
a storing component configured to store the second search term as a mining search term; and
a mining component configured to mine for the one or more biology-related documents based on the mining search term received from the user device, wherein the searching component is further configured to generate the second search term from one of the one or more first search result phrases by:
identifying the tagged named biological entities and the tagged morphological segments from the one of the one or more first search result phrases,
determining an occurrence order of the identified tagged named biological entities and the tagged morphological segments in the one of the one or more first search result phrases,
selecting, based on the determined occurrence order, one or more of the named biological entities or the morphological segments from the one of the one or more first search result phrases, and
generating the second search term to include the selected one or more of the named biological entities or the morphological segments.

10. The server of claim 9, wherein the morpheme divider is configured to divide the one or more biology-related documents into the plurality of morphological segment by:
dividing the one or more biology-related documents into a plurality of sentences; and
dividing the respective sentences into the plurality of morphological segments.

11. The server of claim 9, wherein the parsing component is configured to parse, from the plurality of morphological segments, the plurality of named biological entities by:
generating a list of named biological entities;
storing the list of named biological entities; and
parsing, from the plurality of morphological segments, the plurality of named biological entities based on the list of named biological entities,
wherein the list of named biological entities respectively corresponds to one or more of genomes, diseases variations or drugs.

12. The server of claim 9, wherein the searching component is further configured to measure a time required for the searching.

13. The server of claim 12, further comprising:
a manager configured to determine, based on the measured time, an accuracy of the first search term.

14. The server of claim 9, wherein the tagging component is configured to tag the one or more of the plurality of morphological segments by assigning a name to each of the one or more of the plurality of morphological segments.

15. The server of claim 9,
wherein the searching component is further configured to search, from the biology-related source database, a plurality of second search result phrases including the second search term; and
wherein the input receiver is further configured to receive, from the user device, an input to retrieve a third search term from one of the plurality of second search result phrases including the second search term.

16. The server of claim 9,
wherein the input receiver is further configured to receive one of the list of named biological entities from the user device;
wherein the searching component is further configured to search on the list of named biological entities for a different named biological entity having a same meaning as the named biological entity; and wherein the server further comprises a transmitter configured to transmit, to the user device, the different named biological entity having a same meaning as the named biological entity.

17. A non-transitory computer-readable storage medium having thereon computer-executable instructions that, in response to execution, cause a device to perform operations, comprising:
dividing one or more biology-related documents into a plurality of morphological segments based on a natural language processing (NLP) scheme;
parsing a plurality of named biological entities from the plurality of morphological segments;
tagging each of the plurality of named biological entities with a named entity including any one of a gene, disease, variation or drug;
tagging one or more of the plurality of morphological segments as a morphological segment;
generating a biology-related source database that includes the tagged named biological entities and the tagged morphological segments;
receiving, from a user device, a first search term including one or more of the tagged named biological entities and one or more of the tagged morphological segments;
searching the biology-related source database for one or more first search result phrases that include at least one occurrence of the first search term;
receiving, from the user device, an input to retrieve a second search term from the one or more first search result phrases;
generating the second search term that includes at least one morphological segment from one of the one or more first search result phrases, wherein the generating the second search term comprises:
identifying the tagged named biological entities and the tagged morphological segments from the one of the one or more first search result phrases,
determining an occurrence order of the identified tagged named biological entities and the tagged morphological segments in the one of the one or more first search result phrases,
selecting, based on the determined occurrence order, one or more of the named biological entities or the morphological segments from the one of the one or more first search result phrases, and
generating the second search term to include the selected one or more of the named biological entities or the morphological segments;
storing the second search term as a mining search term; and
mining for the one or more biology-related documents based on the mining search term received from the user device.

18. The non-transitory computer-readable storage medium of claim 17, further comprising:
searching, from the biology-related source database, a plurality of second search result phrases including the second search term; and
receiving, from the user device, an input to retrieve a third search term from one of the plurality of second search result phrases including the second search term.

* * * * *